Figure 1:
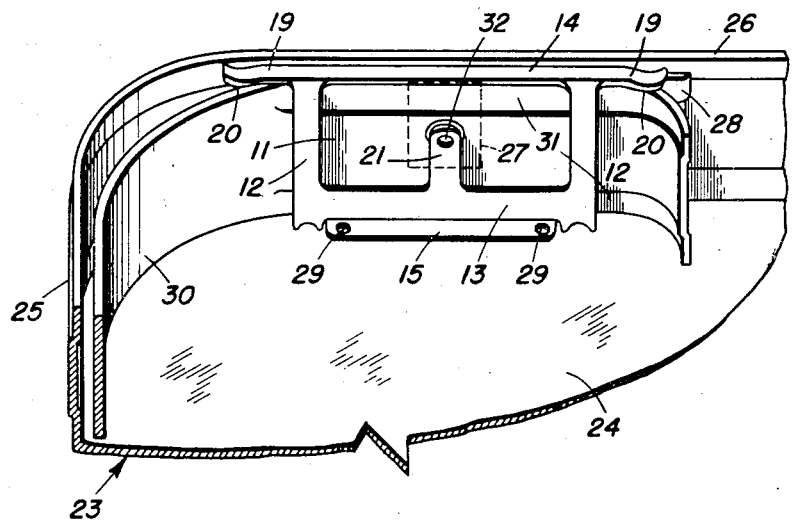

March 8, 1949. C. H. JACOBSON 2,464,180
FILM GUIDING AND POSITIONING DEVICE
Filed July 11, 1947

INVENTOR
CARL H. JACOBSON
BY
ATTORNEY

Patented Mar. 8, 1949

2,464,180

UNITED STATES PATENT OFFICE 2,464,180

FILM GUIDING AND POSITIONING DEVICE

Carl H. Jacobson, Binghamton, N. Y., assignor to General Aniline & Film Corporation, New York, N. Y., a corporation of Delaware Application July 11, 1947, Serial No. 760,458

9 Claims. (Cl. 88—17)

This invention relates to an improved film guiding and positioning device, particularly for use in motion picture cameras.

In motion picture cameras currently manufactured, especially for amateur photographers, it is customary to provide a film magazine adapted to be mounted in the camera for exposure of the film and employed for transporting the unexposed film to the user, and after exposure as a container for the film until the latter is developed. Such magazines are ordinarily reloaded and used over again a number of times. They are sold ready for insertion in a motion picture camera and after the film is exposed, the magazine is used as a container to send the film for development, and is often subjected to relatively rough handling during transportation.

During operation of the camera, the film, carried by a pair of reels within the magazine, is advanced past an aperture or gate in the magazine wall, at which successive portions or frames of the film are exposed to light from the lens. Means for guiding and positioning the film are provided at the gate, to insure that the film will be accurately held in the focal plane of the lens during exposure to insure sharpness of the image, as well as to prevent lateral displacement of the film which may be caused by variations in width thereof or by unequal advancing tension thereon, in order that the frames will be accurately aligned.

In commercial constructions heretofore known, an interiorly fastened aperture plate is usually provided in the magazine extending around the aperture or gate, and having a film-front-supporting surface for locating the film in the focal plane of the lens. The film is guided to and from the gate along a runway pad supporting the rear surface of the film. At the gate the film is ordinarily pressed forwardly against the aperture plate, such pressure being commonly applied by a resiliently-urged pressure pad over which the film passes and movable independently of the runway pad or magazine casing. To hold the film against lateral displacement, a separate guide means is usually provided, mounted on the runway pad or magazine casing, to guide and align the edges of the film, thus preventing lateral displacement thereof as it passes the gate.

Provision of the aforesaid guiding and positioning devices heretofore employed involved manufacture of relatively numerous parts having minute tolerances, and required great accuracy in assembling the parts with the magazine casing, rendering such manufacture and assembly relatively tedious and expensive. In addition, the provision of numerous parts increased the possibility that one or more of them would get out of alignment, resulting in inferior or spoiled films. Since the magazines were often subjected to severe handling in shipment to and from the user, damage to the magazines often occurred so that they had to be discarded or repaired after only a few loadings, greatly increasing the cost of their use.

It is an object of this invention to provide simplified means for guiding and positioning the film at the gate of the film magazine, whereby only a single member is required to effect lateral alignment of the film as well as to provide positioning pressure for holding the film in the focal plane of the lens.

It is also an object of the invention to provide film guiding and positioning means which can be readily manufactured and assembled with minimum effort and expense.

A further object is to provide film guiding and positioning means of rugged and durable construction, capable of withstanding severe handling in shipment or use, without injury to its adjustment.

In accordance with my invention, I provide a single lateral guide and pressure member, mounted in fixed position on a wall of the magazine casing adjacent the aperture or gate, having means for engaging opposite edges of the film to maintain its alignment, and also means for exerting pressure to hold the film against the aperture plate of the magazine. The lateral guide means includes fixed rigid projections supporting one edge of the film, and resilient projections engaging the opposite edge of the film and urging it against the aforesaid rigid projections. Means for mounting the aforesaid member on the casing is preferably provided adjacent the fixed guiding projections to insure maximum rigidity therein.

To provide the pressure required to hold the film against the aperture plate, the aforesaid member of my invention includes a resilient projection adapted to exert pressure against the rear of a movable film-supporting member at the gate, so that the film will be reliably held against the aperture plate and thereby maintained in the focal plane of the lens.

In a preferred embodiment of my invention, the runway pad itself is movable toward and away from the aperture plate, so that it is adapted to hold the film against the said plate, and the resilient projection of the aforesaid guide member exerts its pressure against the rear surface of the runway pad, thus avoiding the necessity of providing and assembling a separate pressure pad for positioning the film. To prevent lateral or longitudinal displacement of the runway pad, the latter is preferably secured to the resilient projection of the guide member exerting pressure thereon. Moreover, by supporting the runway pad on the rigid film edge engaging projections of the guide member, the pad is reliably held against pivotal movement about the point of attachment thereof to the resilient projection, and the pad is thus maintained in alignment with the path of the film supported thereby.

The guide and pressure member of my invention can be readily manufactured by stamping or similar shaping operations from sheet metal, and its assembly with a magazine casing and runway pad can be reduced to a minimum number of operations. By reason of its simple and rugged construction, the device of my invention maintains its adjustment for many reloadings.

Figure 2:
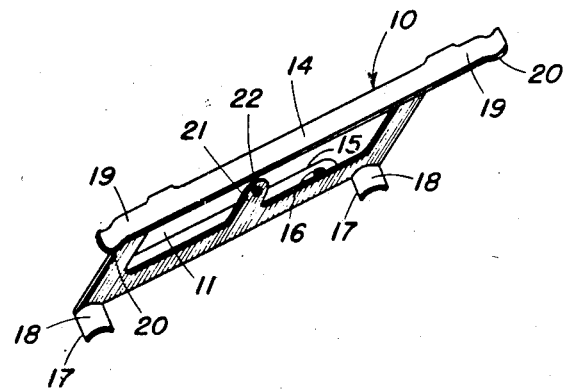

Other objects and advantages will appear from the following description of a preferred embodiment of my invention, taken in conjunction with the accompanying drawing, wherein:

Fig. 1 is a perspective view of a portion of the interior of a film magazine, showing the film guiding and positioning device of my invention; and Fig. 2 is a perspective detail of the film guiding and pressure member included in Fig. 1.

Referring to the drawing, the guiding and pressure member 10, which can be advantageously made of sheet steel, brass or similar resilient metals or alloys, includes a substantially flat framework having a broad central aperture 11 bounded at opposite ends by vertical strips 12, at its base by a longitudinal strip 13, and at the top by a flange 14 bent at right angles to the plane of the framework.

At the lower edge of the strip 13, a mounting flange 15 extends at right angles to the plane of the framework, and includes means, such as apertures 16, for securing the same to a wall of a magazine casing. The flange 15 advantageously extends in opposite direction from the flange 14 on the opposite edge of the framework.

Rigid fixed guide means for supporting and aligning one edge of the film are provided by a pair of tabs 17 projecting outwardly at right angles to the framework adjacent opposite ends of the lower ends of longitudinal strip 13, in the same direction as flange 14. These tabs are preferably bent to cylindrical, arcuate shape about an axis perpendicular to the frame of the framework, so as to present convex upper surfaces 18 to the edge of the film supported thereby, thus providing substantially point contact with the edge of said film and having a smooth surface which avoids any tendency to catch in nicks or other irregularities in the film. The arcuate shape of these tabs likewise increases their resistance to flexure.

Cooperating means for holding a film against the rigid support tabs 17 comprises a pair of tabs 19 extending longitudinally outward from opposite ends of the flange 14, of sufficient length that their ends can flex resiliently toward and away from tabs 17. At their tips, tabs 17 are bent, as shown, to present smooth convex surfaces 20 for engaging the end of a film with point contact, and likewise avoiding any tendency to catch in nicks or irregularities in the film. The transverse or vertical spacing between resilient tab surfaces 20 and rigid tab surfaces 18 is equal to or a shade less than the normal width of a film to be guided thereby, so that when the film is passed lengthwise between the two pairs of tabs, with one of its edges engaging surfaces 18, tabs 19 exert a gentle resilient pressure on the opposite edge to insure transverse positioning and to prevent lateral displacement of the film relative to the guide member 10 or a magazine casing to which the latter may be secured.

Means for exerting pressure to hold the film against an aperture plate surrounding the gate of a magazine comprises a resilient finger 21 projecting from the longitudinal strip 13 to the center of the aperture 11. Finger 21 may lie in the plane of the central framework of member 10, or can be bent slightly outward from said plane, e. g. in the direction of tabs 17 and flange 14. Means, such as an aperture 22 at the end of the finger 21, is preferably provided for securing a film support thereto, so that when the member 10 is mounted in a magazine casing, finger 21 resiliently urges the film support toward the aperture plate surrounding the gate.

As shown in Fig. 1, the guiding and positioning member 10 is assembled with the casing 23 of a film magazine having a sidewall 24 and end and front walls 25 and 26, the latter having an aperture or gate 27 (shown in dotted lines) to define the limits of the image on successive frames of a film. An aperture plate 28 of conventional construction, secured to the front wall 26, extends on both sides of the gate 27, and has a smooth plane inwardly-facing film supporting surface for locating the film in the focal plane of the lens of the camera in which the magazine is mounted.

The film guiding and pressure member 10 of my invention has its lower flange 15 rigidly secured, e. g. by a pair of machine screws 29, to the sidewall 24 of casing 23, the framework of said member extending outward from said wall parallel to and spaced a short distance from the aperture plate 28. Tabs 17 and 19 extend outward from said member to the aperture plate 28, defining a guiding channel along which a film may be passed. To support the rear surface of the film as it passes the gate 27, a runway pad 30 is provided, having, for example, rigid, smooth, flat film-engaging ridges 31 extending past the gate 27 and on opposite sides thereof, and adapted to lie flat against the corresponding plane surfaces of aperture plate 28 when urged toward the latter. The runway pad 30 passes between the framework of member 10 and the aperture plate 28, and likewise between tabs 17 and 19, and is secured to the end of resilient finger 21, e. g. by means of machine screw 32.

Finger 21 resiliently urges pad 30 toward aperture plate 28 and holds a strip of film inserted between said parts against the locating surface of the aperture plate.

Except for its attachment to the end of resilient finger 21, the pad 30 is preferably not rigidly secured to any other part of the magazine. It is thus free to move toward and away from the aperture plate 28 under the influence of resilient finger 21. However, the attachment of said finger to the pad retains the latter against longitudinal or lateral displacement within the casing. In addition, the lower edge of the runway pad 30 preferably rests on rigid tabs 17 of the member 10, thus maintaining the pad in alignment with the film and preventing pivotal movement of the pad about its point of attachment to the finger 21. Hence, the pad 30 requires, and preferably has, no additional means other than its attachment to the finger 21 of member 10 for securing it in the magazine.

In assembling the film guiding and positioning device of my invention with a magazine casing, it is merely necessary to fasten the runway pad 30 to finger 21, and then to secure flange 15 of member 10 to the wall 24 of the magazine casing. When a threaded fastening means is employed, removal and replacement of the parts is carried out with equal facility.

In order to load a magazine including the film guiding and positioning device of my invention, the runway pad 30 is manually retracted from aperture plate 28 against the resilient pressure of finger 21, and the end of the film from the pay-off reel is inserted between the pad 30 and aperture plate 28 (from right to left in Fig. 1) and between tabs 17 and 19, the latter yielding to permit the film to pass between them. The film is pushed along until it emerges at the other end of the pad 30, the latter being then released and the film drawn through to complete the threading operation. When released, the pad 30 holds the film in surface contact with aperture plate 28, maintaining the film in the focal plane of the camera lens, while tabs 17 and 19 retain the film against lateral displacement as it is advanced during the picture-taking operation.

It will be observed that the film guiding and positioning device, including the lateral film guiding and pressure member of my invention, greatly simplifies the manufacture and assembly of a film magazine, and at the same time provides a reliable structure for accurately positioning and guiding the film, adapted to withstand rough handling in transportation or use without danger of becoming maladjusted. The number of parts is reduced to a minimum and assembly and replacement can be easily carried out.

Variations and modifications can be made in the device illustrated in the drawing and hereinbefore described without departing from the scope of the invention and portions thereof can be used without others.

What I claim is:

1. In a film magazine for a motion picture camera having a frame-defining aperture, a film-front-supporting surface adjacent said aperture for locating a film in the focal plane of the camera and means for advancing a film strip across said surface past said aperture, film guiding and positioning means comprising a fixed member spaced inwardly from said film-front-supporting surface, having film edge aligning means extending outward toward said surface on opposite sides of said aperture, a movable runway pad extending between said film-edge aligning means and between said member and said surface for supporting the rear of the film strip as it passes said aperture, and means carried by said member resiliently urging said runway pad toward said film-front-supporting surface to hold a film in surface contact therewith.

2. In a film magazine for a motion picture camera having a frame-defining aperture, a film-front-supporting surface adjacent said aperture for locating a film in the focal plane of the camera and means for advancing a film strip across said surface past said aperture, film guiding and positioning means comprising a fixed member spaced inwardly from said film-front-supporting surface, having fixed film-edge-aligning means extending outward toward said surface at one side of said aperture and resilient film-edge-engaging means extending outward toward said surface on the opposite side of said aperture for urging a film into edge contact with said fixed film-edge-aligning means, a movable runway pad extending between said film-edge-aligning means and said resilient film-edge-engaging means, and supported at one edge on said fixed film-edge-aligning means, and resilient means interconnecting said member and said runway pad and urging the latter toward said film-front-supporting surface to hold a film in surface contact therewith.

3. In a film magazine for a motion picture camera having a frame-defining aperture, a film-front-supporting surface adjacent said aperture for locating a film in the focal plane of the camera and means for advancing a film strip across said surface past said aperture, film guiding and positioning means comprising a fixed member spaced inwardly from said film-front-supporting surface, having fixed film-edge-aligning means extending outward toward said surface at one side of said aperture and resilient film-edge-engaging means extending outward toward said surface on the opposite side of said aperture for urging a film into edge contact with said fixed film-edge-aligning means, a movable runway pad supported at one edge on said fixed film-edge-aligning means and extending between the latter means and said resilient film-edge-engaging means, and resilient means interconnecting said member and said runway pad and urging the latter toward said film-front-supporting surface to hold a film in surface contact therewith, said resilient means restraining said pad against displacement parallel to the plane of said surface.

4. A device as defined in claim 2, wherein said member is affixed to a side wall of said film magazine adjacent the fixed film-edge-aligning means of said member.

5. In a film magazine for a motion picture camera having a frame-defining aperture, an interiorly facing aperture plate around said aperture for locating a film in the focal plane of a camera, and means for advancing a film strip across said plate past said aperture, film guiding and positioning means comprising a fixed framework facing said aperture plate and spaced inwardly therefrom, a plurality of rigid film-edge-supporting projections on one side of said framework extending outward to said aperture plate at one side of said aperture for supporting and aligning the edge of a film passing over said aperture plate, a plurality of resilient film-edge-engaging projections on the opposite side of said framework extending outward to the plane of the aperture plate on the opposite side of said aperture for urging said film against said rigid projections, a movable runway pad for supporting the rear surface of a film, said pad extending between said framework and said aperture plate and between said resilient and rigid projections, and a resilient projection on said framework engaging said runway pad at a point behind said aperture and urging said pad toward said aperture plate to hold a film passing over the latter in surface contact therewith.

6. In a film magazine for a motion picture camera having a frame-defining aperture, an interiorly facing aperture plate around said aperture for locating a film in the focal plane of a camera, and means for advancing a film strip across said plate past said aperture, film guiding and positioning means comprising a fixed framework facing said aperture plate and spaced inwardly therefrom, a plurality of rigid film-edge-supporting projections on one side of said framework extending to said aperture plate at one side of said aperture for supporting and aligning the edge of a film passing over said aperture plate, a plurality of resilient film-edge-engaging projections on the opposite side of said framework extending to the plane of the aperture plate on the opposite side of said aperture for urging said film against said rigid projections, a movable runway pad for supporting the rear surface of a film, said pad extending between said framework and said aperture plate, between said resilient and rigid projections, and supported edgewise on said rigid projections, and a resilient projection on said framework attached to said runway pad at a point behind said aperture, urging said pad toward said aperture plate to hold a film passing over the latter in surface contact therewith, and holding said pad against lateral and longitudinal displacement.

7. In a device of the type described, a film edge guiding and pressure member comprising a substantially flat framework surrounding a central aperture, a rectangular flange at one side for securing said member to a film magazine, a pair of rigid film-edge-supporting tabs extending outward at right angles from said framework on the side adjacent said flange, a rectangular flange on the opposite side of said framework extending therefrom in the same direction as said tabs, a pair of resilient film-edge-engaging tabs extending from opposite ends of the last-named flange for urging a film edgewise against said rigid tabs, and a resilient finger extending from one side of said framework toward the opposite side of its central aperture and yielding in a direction normal to the plane of said framework, for urging a movable film support against a fixed film support in said film magazine.

8. In a device of the type described, a film edge guiding and pressure member comprising a substantially flat framework surrounding a central aperture, a rectangular flange at one side for securing said member to a film magazine, a pair of rigid film-edge-supporting tabs having cylindrically convex film-edge-engaging surfaces, extending outward at right angles from said framework on the side adjacent said flange, a rectangular flange on the opposite side of said framework extending therefrom in the same direction as said tabs, a pair of resilient film-edge-engaging tabs extending from opposite ends of the last-named flange, said resilient tabs having convex film-edge-engaging tip portions for urging a film edgewise against said rigid tabs, and a resilient finger extending from one side of said framework toward the opposite side of its central aperture and yielding in a direction normal to the plane of said framework, for urging a movable film support against a fixed film support in said film magazine, said finger having means at its tip for securing the same to said movable film support.

9. In a device of the type described, a film-edge guiding and pressure member comprising a substantially flat framework, means at one side of said framework for securing said member to a film magazine, a pair of rigid film-edge-supporting means extending outward from the plane of said framework at one side thereof, resilient film-edge-engaging means extending outward at the opposite side of said framework in the same direction as said supporting means for urging a film edgewise against said supporting means, and means in the central portion of said framework for resiliently urging a movable film support against a fixed film support in said film magazine.

CARL H. JACOBSON.

REFERENCES CITED

The following references are of record in the file of this patent:

UNITED STATES PATENTS

| Number | Name | Date |
| --- | --- | --- |
| 2,143,769 | Fairbanks | Jan. 10, 1939 |